United States Patent
Holmes

(10) Patent No.: US 7,645,205 B2
(45) Date of Patent: Jan. 12, 2010

(54) ELECTRICALLY-VARIABLE TRANSMISSION WITH TWO DIFFERENTIAL GEAR SETS

(75) Inventor: Alan G. Holmes, Clarkston, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 413 days.

(21) Appl. No.: 11/675,332

(22) Filed: Feb. 15, 2007

(65) Prior Publication Data

US 2008/0200296 A1   Aug. 21, 2008

(51) Int. Cl.
F16H 3/72 (2006.01)
(52) U.S. Cl. .......................................................... 475/5
(58) Field of Classification Search ...................... 475/5, 475/149, 150
See application file for complete search history.

(56) References Cited

U.S. PATENT DOCUMENTS

| | | | |
|---|---|---|---|
| 6,945,894 B2 | 9/2005 | Holmes | |
| 6,953,409 B2 * | 10/2005 | Schmidt et al. | 475/5 |
| 7,220,203 B2 * | 5/2007 | Holmes et al. | 475/5 |
| 7,278,941 B2 * | 10/2007 | Holmes et al. | 475/5 |
| 7,416,501 B2 * | 8/2008 | Holmes et al. | 475/5 |
| 7,473,199 B2 * | 1/2009 | Bucknor et al. | 475/5 |
| 2006/0019785 A1 * | 1/2006 | Holmes et al. | 475/5 |

* cited by examiner

*Primary Examiner*—Ha D. Ho

(57) ABSTRACT

An electrically-variable transmission has four motive elements, including an input member, an output member, and first and second motor/generators. The transmission also has two differential gear sets, and four selectively engagable torque-transmitting mechanisms. All members of each differential gear set have at least one of the motive elements connectable therewith. The input member and one motor/generator are both connected or connectable with the same member of one of the differential gear sets, and the output member and either of the motor/generators are both connected or connectable with the same member of the other one of the differential gear sets. The torque-transmitting mechanisms are selectively engagable in combinations of two to establish input-split and output-split electrically-variable modes of operation.

16 Claims, 2 Drawing Sheets

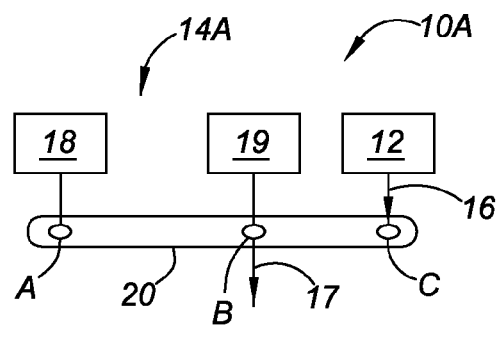
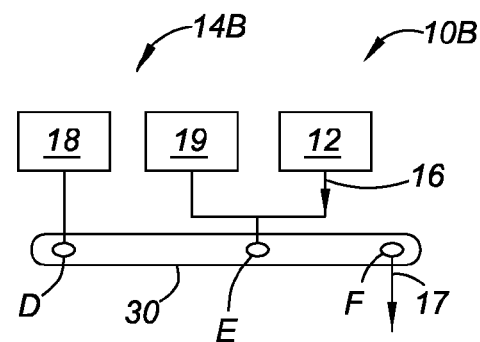
FIG. 1　　　　　　　FIG. 2
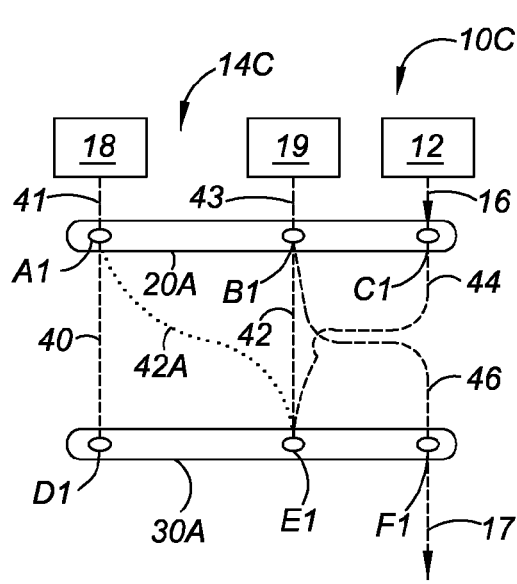
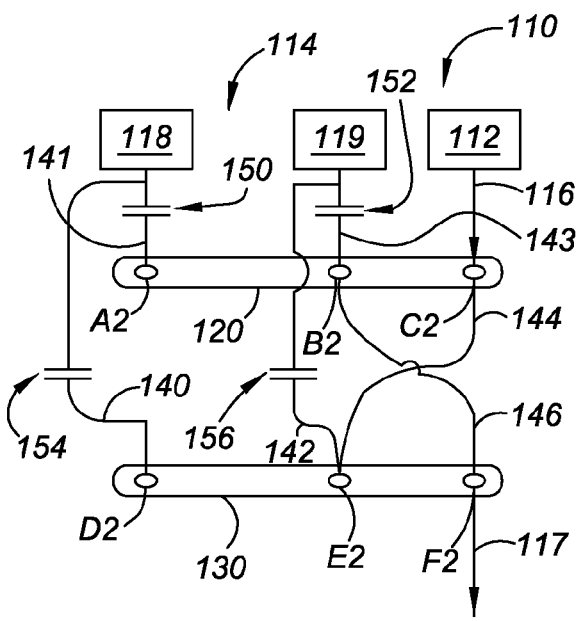
FIG. 3　　　　　　　FIG. 4

ELECTRICALLY-VARIABLE TRANSMISSION WITH TWO DIFFERENTIAL GEAR SETS

TECHNICAL FIELD

The invention relates to an electrically-variable transmission that has only two differential gear sets.

BACKGROUND OF THE INVENTION

Electrically-variable transmissions typically have an input member connected to an engine and one or two motor/generators connected to different members of planetary gear sets to allow one or more electrically-variable modes of operation, fixed speed ratio modes, and an electric-only (battery powered) mode, when connected with a battery. Electrically-variable transmissions may improve vehicle fuel economy in a variety of ways. For instance, the engine may be turned off at idle, during periods of deceleration and braking, and during periods of low speed or light load operation to eliminate efficiency losses due to engine drag. Captured braking energy (via regenerative braking) or energy stored by one of the motors acting as a generator during periods when the engine is operating is utilized during these engine off periods to keep the engine off longer, supplement engine torque or power and/or operate at a lower engine speed, or supplement accessory power supplies. Transient demand for engine torque or power is supplemented by the motor/generators during operation in engine-on, electrically-variable modes, allowing for downsizing the engine without reducing apparent vehicle performance. Additionally, the engine may be operated at or near the optimal efficiency point for a given power demand because the speed ratio between the engine and the output member of the transmission can be continuously variable by the action of a gear set and a motor/generator. Additionally, the motor/generators are very efficient in accessory power generation and electric power from the battery serves as an available torque reserve allowing operation at a relatively low transmission numerical speed ratio.

SUMMARY OF THE INVENTION

An electrically-variable transmission is provided that uses only two differential gear sets, two motor/generators, and four torque-transmitting mechanisms that can preferably obtain both an input-split, electrically-variable mode of operation and an output-split, electrically-variable mode of operation. The differential gear sets are preferably planetary gear sets, and each has a first, a second, and a third member, which may include a ring gear member, a carrier member and a sun gear member.

The electrically-variable transmission has an input member, which is operatively connectable to an engine, and an output member, which is operatively connectable to a final drive mechanism for providing traction on a vehicle. The input member, the output member, the first motor/generator, and the second motor/generator are all motive elements for the transmission. Two of these motive elements are each continuously operatively connected to a respective member of the first differential gear set and a respective member of the second planetary gear set. By "respective member", it is meant that each of these two motive elements connects to a different member of each gear set than the other. The other two motive elements are each selectively operatively connectable with any respective one of the members of the first differential gear set and with any respective one of the members of the second differential gear set via the four torque-transmitting mechanisms.

The continuous and selective operative connections described above are chosen so that each member of each differential gear set has at least one of the motive elements either continuously or selectively operatively connected therewith, the input member and one of the motor/generators are both continuously operatively connected or selectively operatively connectable with the same member of one of the differential gear sets, and the output member and one of the motor/generators are both continuously operatively connected or selectively operatively connectable with the same member of the other differential gear set. The torque-transmitting mechanisms may be selectively engagable in combinations of two to establish the input-split, electrically-variable mode and the output-split, electrically-variable mode. Preferably, engagement of all four of the torque-transmitting mechanisms establishes a fixed ratio operating mode.

The motor/generator that is continuously operatively connected or selectively operatively connectable with the same member of one of the differential gear sets as the input member may be the same or may be different from the motor/generator that is continuously operatively connected or selectively operatively connectable with the same member of the other differential gear set as the output member.

In one embodiment, neither the input member nor the output member is continuously operatively connected with any of the members of any of the differential gear sets. In another embodiment, neither of the motor/generators is continuously operatively connected with any of the members of either of the differential gear sets.

In one embodiment, there are two interconnecting members that each continuously connects the respective member of the first differential gear set for common rotation with the respective member of the second differential gear set with which two of the motive elements are each continuously operatively connected. In this instance, the differential gear sets may both be planetary gear sets with the input member continuously operatively connected with the ring gear member of the first planetary gear set, the output member continuously operatively connected with the ring gear member of the second planetary gear set, one of the interconnecting members connecting the ring gear member of the first planetary gear set for common rotation with the carrier member of the second planetary gear set, and the other interconnecting member connecting the carrier member of the first planetary gear set for common rotation with the ring gear member of the second planetary gear set.

In one embodiment, if the differential gear sets are both planetary gear sets, the first torque-transmitting mechanism selectively operatively connects the first motor/generator with the sun gear member of the first planetary gear set, the second torque-transmitting mechanism selectively operatively connects the second motor/generator with the carrier member of the first planetary gear set, the third torque-transmitting mechanism selectively operatively connects the first motor/generator with the sun gear member of the second planetary gear set, and the fourth torque-transmitting mechanism selectively operatively connects the second motor/generator with the carrier member of the second planetary gear set.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic illustration of an input-split, electrically-variable transmission in lever diagram form;

FIG. 2 is a schematic illustration of an output-split, electrically-variable transmission in lever diagram form;

FIG. 3 is a schematic illustration in lever diagram form of an electrically-variable transmission with two differential gear sets and the necessary connections to enable an input-split operating mode and an output-split operating mode;

FIG. 4 is a schematic illustration in lever diagram form of one embodiment of an electrically-variable transmission within the scope of the invention;

DESCRIPTION OF THE PREFERRED EMBODIMENTS

Figure 5:
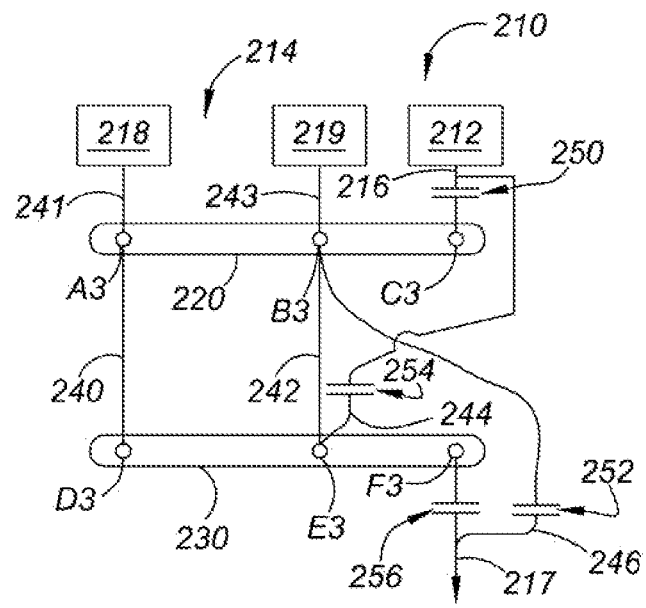
FIG. 5 is a schematic illustration in lever diagram form of another embodiment of an electrically-variable transmission within the scope of the invention.

Referring to the drawings, wherein like reference numbers refer to like components, FIG. 1 illustrates a powertrain 10A having a transmission 14A that provides an input-split, electrically-variable mode of operation. The transmission 14A includes a three-node lever 20 representing a first planetary gear set having a first, a second and a third member, represented by nodes A, B and C, respectively. The members may be a sun gear member, a carrier member and a ring gear member, although not necessarily in that order. A transmission input member 16 is connected for rotation with node C and an output member is connected for rotation with node B.

As used herein, a "node" is a component of a transmission, such as a ring gear member, a carrier member, or a sun gear member, which is characterized by a rotational speed and which can act as a junction of torques applied to that component from other components and by that component to other components. The other components which may interact with a given node include other coaxial members of the same set of planetary gears which appear as other nodes on the same lever. The other components which may interact with a given node also include interconnections to members of other planetary gear sets which appear as nodes on another lever, a stationary member such as the transmission case, and other transmission members.

The powertrain 10A includes an engine 12 connected with the input member 16. The engine 12 and input member 16 are connected with node C. A first motor-generator 18 and a second motor/generator 19 are connected to nodes A and B of the electrically-variable transmission 14A, respectively. An output member 117 is connected to node B. The input member 116, output member 177, motor/generator 118, and motor/generator 119 are four separate motive elements of the transmission 14A, as each provides motive power to and/or receives motive power from the transmission 14A.

Each embodiment of a powertrain and transmission discussed herein has an electric power source that is operatively connected to the motor/generators such that the motor/generators may transfer power to or receive power from the power source. A controller is operatively connected to the electric power source to control the distribution of power from or to the power source. An electric power source may be one or more batteries. Other electric power sources, such as fuel cells or capacitors, have the ability to provide, or store and dispense, electric power and may be used in combination with or in place of batteries. An electric power source and controller is shown and described with respect to the embodiment of FIG. 6, which is shown in stick-diagram form. The embodiments of FIGS. 1-5, which are shown in lever diagram form, also incorporate an electric power source and controller, although not shown, which are operatively connected to the motor/generators in like manner as shown in FIG. 6.

In general, an "input-split" mode uses gearing to split the power flow through a transmission from an input member to an output member by speed in closest association with the input member. That is, in an input-split mode, the speed of the input member is not directly proportional to the speeds of either of the motor/generators but the speed of the output member is directly proportional to the speed of a motor/generator. In the powertrain 10A, the speed of the input member 16 is directly proportional to the speed of the engine 12, but is not directly proportional to the speed of either of the motor/generators 18 and 19. The speed of the output member 17 is directly proportional to the speed of the second motor/generator 19. The transmission 14A is electrically-variable in that the speed ratio between the input member 16 and the output member 17 is determined by the speed of the motor/generator 18.

Referring to FIG. 2, another powertrain 10B is illustrated that has a transmission 14B configured to provide an output-split, electrically-variable mode of operation. In general, an "output-split" mode uses gearing to split the power flow through a transmission from an input member to an output member by speed in closest association with both the input member and one of the motor/generators. In other words, an output-split mode uses gearing to combine the power flow through the transmission from an input member to an output member by speed in closest association with the output member. That is, in an output-split mode, the speed of the input member is directly proportional to the speed of one of the motor/generators but the speed of the output member is not directly proportional to the speed of a motor/generator.

In the powertrain 10B, the transmission 14B includes a three-node lever 30 representing a planetary gear set having a first, a second and a third member, represented by nodes D, E and F, respectively. The members may be a sun gear member, a carrier member and a ring gear member, although not necessarily in that order. The engine 12 and input member 16, as well as motor/generator 19 are operatively connected with node E, so the speed of the input member 16 is directly proportional to the speed of the motor/generator 19. The motor/generator 18 is connected with node D. The output member 17 is connected with node F, so the speed of the output member 17 is not directly proportional to the speed of either motor/generator 18 or 19. The transmission 14B is electrically-variable in that the speed ratio between the input member 16 and the output member 17 is determined by the speed of the motor/generator 18.

Referring to FIG. 3, a powertrain 10C is illustrated that has an electrically-variable transmission 14C configured to provide both an input-split, electrically-variable mode of operation and an output-split, electrically-variable mode of operation. The transmission 14C combines the functionality of the transmission 14A of FIG. 1 and the transmission 14B of FIG. 2 by including two planetary gear sets, represented by levers 20A and 30A, and appropriate connecting members, as discussed below. The planetary gear set represented by lever 20A has a first, a second and a third member, represented by nodes A1, B1 and C1, respectively. The members may be a sun gear member, a carrier member and a ring gear member, although not necessarily in that order. The planetary gear set represented by lever 30A also has a first, a second and a third member, represented by nodes D1, E1 and F1, respectively. The members may be a sun gear member, a carrier member and a ring gear member, although not necessarily in that order.

The transmission 14C includes input member 16 and output member 17, as well as connecting members 40, 41, 42 (or, alternatively, 42A), 43, 44 and 46. The connecting members are shown as dashed lines to indicate that they may represent fixed connections or clutched connections, depending on the specific ratio ranges desired. A connecting member that is a continuous connection may be referred to herein as an interconnecting member. It should be noted that the connecting member may be a direct connection, such as a shaft or hub that does not itself establish a gear ratio, so that the components operatively connected by the connecting member (i.e., two nodes, a motor/generator and a node, etc.) rotate at the same speed, or the connecting member may be an indirect connection through two or more intermeshing gears such that the components operatively connected by the connecting member rotate at different but proportionate speeds. Connecting member 42A is shown with shorter dashes to indicate that it is an alternative to connecting member 42. The connecting members selectively or continuously operatively connect a node on lever 20A to a node on lever 30A, or connect a motor/generator 18 or 19 to a node.

In order to enable transmission 14C to provide an input-split mode and an output-split mode, two of the connecting members that each connect two nodes (i.e., interconnecting members 40, 42 (or 42A), 44 and 46) must be selective (clutched) connections, while the other two may be continuous connections. Each node must be connected with a connecting member 40, 42 (or 42A), 44 or 46. Additionally, the four motive elements (i.e., the input member 16, the output member 17, motor/generator 18 and motor/generator 19) must be connected so that two of the four motive elements each have a connecting member connected to one of the nodes of lever 20A and a connecting member connected to one of the nodes of lever 30A. The other two motive elements must each have a clutched connecting member connected to one of the nodes of lever 20A and a clutched connecting member connected to one of the nodes of lever 30A. In order to provide an input-split electrically-variable mode, on one of the levers 20A, 30A, the output member 17 and one of the motor/generators must be connected to the same node. This is satisfied in the transmission 14C by connecting motor/generator 19 and output member 17 to node B1 (output member 17 is connected via interconnecting member 46). In order to provide an output-split, electrically-variable mode, on the other planetary gear set (represented by lever 30A in FIG. 3), the input member 16 and one of the motor/generators must be connected to a single node. This is satisfied by connecting motor/generator 19 and input member 16 to node E1 via connecting members 44 and 42, respectively. If connecting member 42A is provided in lieu of connecting member 42, an output-split mode is enabled as motor/generator 18 and input member 16 are both connected to node E1 via connecting members 42A and 44, respectively. Other placements of connecting members not shown in FIG. 3 but satisfying the requirements set forth in this paragraph may also be utilized, such as those illustrated in powertrain 210 of FIG. 5, discussed below.

Referring to FIG. 4, one embodiment of a powertrain 110 is illustrated in lever diagram form that has an engine 112 and motor/generators 118 and 119 connected with a transmission 114. The transmission 114 has two planetary gear sets (represented by levers 120 and 130) and connecting members arranged similar to those in FIG. 3, satisfying the requirements set forth above in order to provide both an input-split, electrically-variable operating mode and an output-split, electrically-variable operating mode. The planetary gear set represented by lever 120 has a first, a second and a third member, represented by nodes A2, B2 and C2, respectively. The members may be a sun gear member, a carrier member and a ring gear member, although not necessarily in that order. The planetary gear set represented by lever 130 also has a first, a second and a third member, represented by nodes D2, E2 and F2, respectively. The members may be a sun gear member, a carrier member and a ring gear member, although not necessarily in that order.

The transmission 114 includes an input member 116, an output member 117, as well as connecting members 140, 141, 142, 143, 144 and 146. The input member 116, output member 117, motor/generator 118, and motor/generator 119 are four separate motive elements of the transmission 114. The input member 116 continuously operatively connects engine 112 with node C2. Output member 117 is continuously operatively connected with node F2. Engagement of a torque-transmitting mechanism 154, which is a rotating-type clutch, enables connecting member 140 to provide a clutched connection between motor/generator 118 and node D2. Engagement of a torque-transmitting mechanism 150, which is a rotating-type clutch, enables connecting member 141 to provide a clutched connection between motor/generator 118 and node A2. Engagement of a torque-transmitting mechanism 156, which is a rotating-type clutch, enables connecting member 142 to provide a clutched connection between motor/generator 119 and node E2. Engagement of a torque-transmitting mechanism 152, which is a rotating-type clutch, enables connecting member 143 to provide a clutched connection between motor/generator 119 and node B2. Connecting member 144 provides a continuous (unclutched) connection between nodes C2 and E2, and may be referred to as an interconnecting member. Similarly, connecting member 146 provides a continuous (unclutched) connection between nodes B2 and F2, and may also be referred to as an interconnecting member.

Input-Split, Electrically-Variable Mode

The transmission 114 is operable to provide an input-split, electrically-variable mode of operation by engaging torque-transmitting mechanisms 150 and 152. Engagement of torque-transmitting mechanisms 150 and 152 operatively connects motor/generators 118 and 119 with nodes A2 and B2, respectively. Torque-transmitting mechanisms 154 and 156 remain open (i.e., not engaged and not transmitting torque). Because interconnecting member 146 continuously operatively connects node F2 and the output member 117 with node B2, motor/generator 118, motor/generator 119, engine 112, input member 116 and output member 117 are operatively connected with nodes A2, B2 and C2 in the same configuration as illustrated with respect to corresponding components in FIG. 1, and an input-split, electrically-variable operating mode is established.

Output-Split, Electrically-Variable Mode

The transmission 114 is operable to provide an output-split, electrically-variable mode of operation by engaging torque-transmitting mechanisms 154 and 156. Engagement of torque-transmitting mechanisms 154 and 156 operatively connects motor/generators 118 and 119 with nodes D2 and E2, respectively. Torque-transmitting mechanisms 150 and 152 remain open (i.e., not engaged and not transmitting torque). Because interconnecting member 144 continuously operatively connects node C2 and the input member 116 with node E2, motor/generator 118, motor/generator 119, engine 112, input member 116 and output member 117 are operatively connected with nodes D2, E2 and F2 in the same configuration as illustrated with respect to corresponding components in FIG. 2, and an output-split, electrically-variable operating mode is established. If, instead of connecting member 142, a clutched connecting member were provided between motor/generator 118 and node E2 that provided an operative connection by engagement of a torque-transmitting mechanism provided in lieu of torque-transmitting mechanism 156, then an output-split mode would be provided by engagement of torque-transmitting mechanism 154 and the alternate torque-transmitting mechanism. In that instance, motor/generator 118 and input member 116 would both be operatively connected to node E2 to establish the output-split mode, while the common connection of motor/generator 119 and output member 117 to node F2 would still establish the input-split mode, as described above.

Fixed Ratio Operating Mode

The transmission 114 establishes a fixed ratio operating mode when all four torque-transmitting mechanisms 150, 152, 154 and 156 are engaged. In that instance, nodes E2 and F2 would both be operatively connected with motor/generator 119. When any two nodes of a three-node lever (and, therefore, any two members of the planetary gear set the lever represents) rotate at the same speed, then the entire planetary gear set rotates at the same speed, as is known. Thus, if all of the connecting members are direct connections that do not establish a gear ratio between the connected members of the planetary gear sets represented by levers 20A and 30A, then with all nodes of lever 130 rotating at the same speed, and with all torque-transmitting mechanisms 150, 152, 154 and 156 engaged, all nodes of lever 120 will also rotate at the same speed, and a direct drive (fixed ratio of 1.0) will be established. If one or more of the connecting members establishes a gear ratio between the connected members of the planetary gear sets represented by levers 20A and 30A, then the resulting fixed ratio between the input member 116 and the output member 117 may have a numerical value other than 1.0. The transmission may shift between the input-split mode and compound-split mode at this fixed ratio with essentially zero relative speeds across all of the torque-transmitting mechanisms 150, 152, 154 and 156, so that they do not need to slip and absorb energy, while at the same time power delivery is maintained between the input member 16 and the output member 17.

Figure 6:
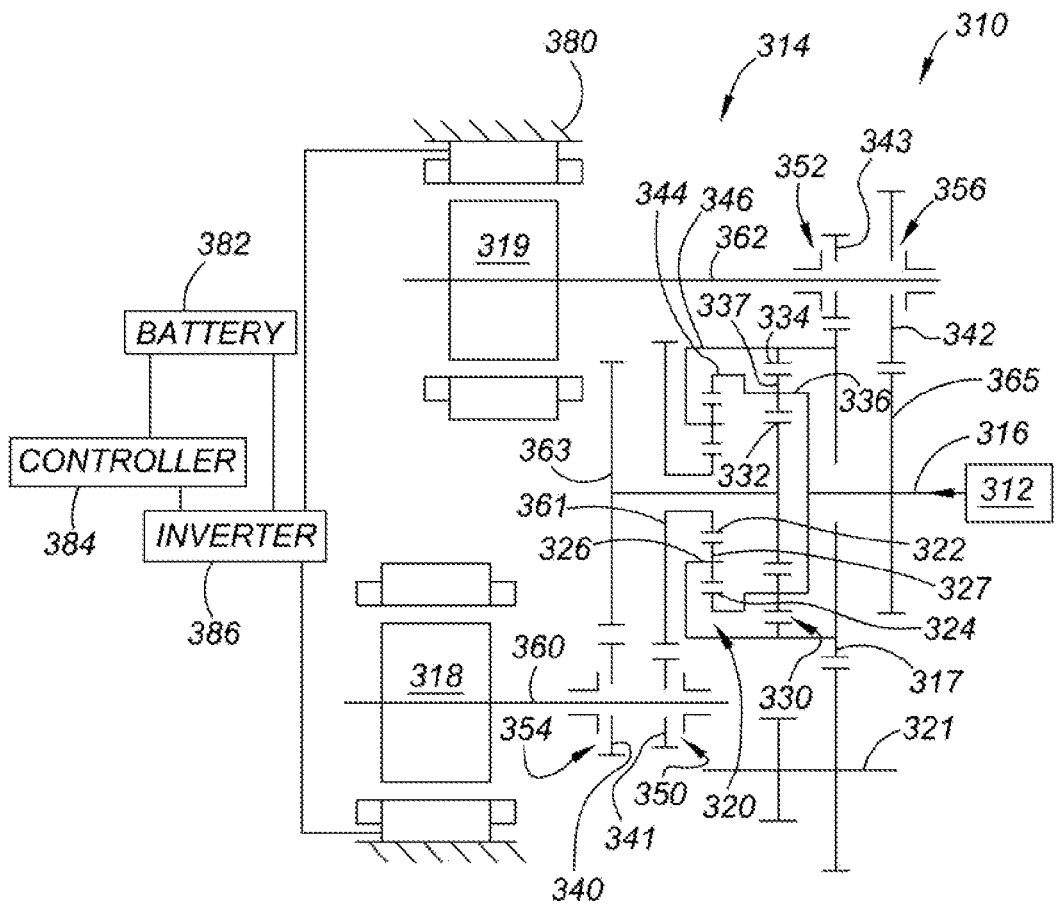
FIG. 6 is a schematic illustration in stick diagram form of one embodiment of the transmission illustrated in lever diagram form in FIG. 4.

Referring to FIG. 5, an alternative embodiment of a powertrain 210 having an electrically-variable transmission 214 and two planetary gear sets represented by levers 220 and 230 is shown that conforms with the requirements described with respect to FIG. 3 to provide an input-split, electrically-variable operating mode as well as an output-split, electrically-variable operating mode. The powertrain 210 has an engine 212 and motor/generators 218 and 219 connected with transmission 214. The transmission 214 is illustrated in lever diagram form and has two planetary gear sets (represented by levers 220 and 230) and connecting members arranged similar to those in FIG. 3, satisfying the requirements set forth above in order to provide both an input-split, electrically-variable operating mode and an output-split, electrically-variable operating mode. The planetary gear set represented by lever 220 has a first, a second and a third member, represented by nodes A3, B3 and C3, respectively. The members may be a sun gear member, a carrier member and a ring gear member, although not necessarily in that order. The planetary gear set represented by lever 230 also has a first, a second and a third member, represented by nodes D3, E3 and F3, respectively. The members may be a sun gear member, a carrier member and a ring gear member, although not necessarily in that order.

The transmission 214 includes an input member 216, an output member 217, as well as connecting members 240, 241, 242, 243, 244, and 246. The input member 216, output member 217, motor/generator 218, and motor/generator 219 are four separate motive elements of the transmission 214. Connecting member 240 continuously operatively connects node A3 with node D3, and therefore may be referred to as an interconnecting member. Connecting member 242 continuously operatively connects node B3 with node E3 and may also be referred to as an interconnecting member. Motor/generators 218 and 219 are continuously operatively connected to nodes A3 and B3, respectively. Neither the input member 216 nor the output member 217 is continuously operatively connected with any of the nodes; instead, clutched connections are provided. Engagement of torque-transmitting mechanism 250, which is a rotating-type clutch, enables the input member 216 to provide a clutched connection between engine 212 and node C3. Engagement of torque-transmitting mechanism 254, which is a rotating-type clutch, enables connecting member 244 to provide a clutched connection between input member and node E3. Engagement of a torque-transmitting mechanism 252, which is a rotating-type clutch, enables connecting member 246 to provide a clutched connection between output member 217 and node B3. Engagement of a torque-transmitting mechanism 256, which is a rotating-type clutch, provides a clutched connection between output member 217 and node F3. Thus, the input member 216 and the output member 217 are each selectively operatively connectable to a respective node of each lever 220, 230, while the motor/generators 218 and 219 are each continuously operatively connected with a respective node of each lever 220, 230.

Input-Split, Electrically-Variable Mode

The transmission 214 is operable to provide an input-split, electrically-variable mode of operation by engaging torque-transmitting mechanisms 250 and 252. Engagement of torque-transmitting mechanisms 250 and 252 operatively connects the input member 216 and the output member 217 with nodes C3 and B3, respectively. Torque-transmitting mechanisms 254 and 256 remain open (i.e., not engaged and not transmitting torque). Because the motor/generators 218 and 219 are continuously operatively connected with nodes A3 and B3, respectively, motor/generator 218, motor/generator 219, engine 212, input member 216 and output member 217 are operatively connected with nodes A3, B3 and C3 in the same configuration as illustrated with respect to corresponding components in FIG. 1, and an input-split electrically-variable operating mode is established.

Output-Split, Electrically-Variable Mode

The transmission 214 is operable to provide an output-split, electrically-variable mode of operation by engaging torque-transmitting mechanisms 254 and 256. Engagement of torque-transmitting mechanisms 254 and 256 operatively connects the input member 216 and the output member 217 with nodes E3 and F3, respectively. Torque-transmitting mechanisms 250 and 252 remain open (i.e., not engaged and not transmitting torque). Because interconnecting member 242 continuously operatively connects node B3 and the motor/generator 219 with node E3, motor/generator 218, motor/generator 219, engine 212, input member 216 and output member 217 are operatively connected with nodes D3, E3 and F3 in the same configuration as illustrated with respect to corresponding components in FIG. 2, and an output-split, electrically-variable operating mode is established.

Fixed Ratio Operating Mode

The transmission 214 establishes a fixed ratio operating mode when all four torque-transmitting mechanisms 250, 252, 254 and 256 are engaged. In that instance, nodes F3, E3 and B3 would be operatively connected for common rotation with output member 217, and nodes C3, B3 and E3 would be operatively connected for common rotation with the input member 217. When any two nodes of a three-node lever (and, therefore, any two members of the planetary gear set the lever represents) rotate at the same speed, then the entire planetary gear set rotates at the same speed, as is known. Thus, if all of the connecting members are direct connections that do not establish a gear ratio between the connected members of the planetary gear sets represented by levers 220, 230, then with all nodes of lever 230 rotating at the same speed, and with all torque-transmitting mechanisms 250, 252, 254 and 256 engaged, all nodes of lever 220 will also rotate at the same speed, and a direct drive (fixed ratio of 1.0) will be established. If one or more of the connecting members establishes a gear ratio between the connected members of the planetary gear sets represented by levers 220, 230, then the resulting fixed ratio between the input member 216 and the output member 217 may have a numerical value other than 1.0.

Referring to FIG. 6, an alternative embodiment of a powertrain 310 having an electrically-variable transmission 314 and two planetary gear sets 320 and 330 is shown that conforms with the requirements described with respect to FIG. 3 to provide an input-split, electrically-variable operating mode as well as an output-split, electrically-variable operating mode. The powertrain 310 has the same continuous and selective operative connections as the powertrain 110 of FIG. 4. The powertrain 310 has an engine 312, an input member 316, an output member 317, and motor/generators 318 and 319 connected with transmission 314. The input member 316, the output member 317 and the motor/generators 318 and 319 are four separate motive elements of the transmission 314. The transmission 314 has two planetary gear sets 320 and 330 and connecting members arranged similar to those in FIG. 3, satisfying the requirements set forth above in order to provide both an input-split, electrically-variable operating mode and an output-split, electrically-variable operating mode.

The planetary gear set 320 has a ring gear member 324, a sun gear member 322 and a carrier member 326 that rotatably supports a plurality of pinion gears 327 that mesh with both the sun gear member 322 and the ring gear member 324.

The planetary gear set 330 has a ring gear member 334, a sun gear member 332 and a carrier member 336 that rotatably supports a plurality of pinion gears 337 that mesh with both the sun gear member 332 and the ring gear member 334.

The engine 312 is continuously operatively connected with the input member 316 and with the carrier member 336. Additionally, because interconnecting member 344 continuously connects the ring gear member 324 with the carrier member 336, the input member 316 is also continuously operatively connected with the ring gear member 324. The output member 317 is continuously operatively connected with the ring gear member 334. Additionally, because interconnecting member 346 continuously connects ring gear member 334 with carrier member 326, the output member 317 is also continuously operatively connected with the carrier member 326. The output member 317 is a gear that intermeshes with a final drive mechanism 321 to transfer torque thereto.

The motor/generators 318 and 319 may receive electrical power from or provide electrical power to an energy storage device 382 such as a battery. An electronic controller 384 is in signal communication with the battery 382 and with a power inverter 386 that is also in electrical communication with stator portions of the motor/generators 318, 319, shown grounded to a stationary member 380 such as a casing of the transmission 314. The controller 384 responds to a variety of input signals including vehicle speed, operator demand, the level at which the battery 382 is charged and the power being provided by the engine 312 to regulate the flow of power between the motor/generators 318, 319 and the battery 382 via the inverter 386, which converts between direct current provided or utilized by the battery 382 and alternating current provided or utilized by the stator portions of the motor/generators 318, 319.

The motor/generator 318 is selectively operatively connected with the sun gear member 322 by engagement of torque-transmitting mechanism 350. The motor/generator 318 includes a rotor portion that rotates with shaft 360. Connecting member 341, which is a gear, rotates about the shaft 360 and is connected for rotation therewith by engagement of torque-transmitting mechanism 350. Connecting member 341 continuously meshes with a gear 361 that rotates commonly with sun gear member 322.

The motor/generator 319 is selectively operatively connected with the carrier member 326 by engagement of torque-transmitting mechanism 352. The motor/generator 319 includes a rotor portion that rotates with shaft 362. Connecting member 343, which is a gear, rotates about the shaft 362 and is connected for common rotation therewith by engagement of torque-transmitting mechanism 352. Connecting member 343 continuously meshes with output member 317, and is thereby connected for common rotation with carrier member 326 and ring gear member 334 when the torque-transmitting mechanism 352 is engaged.

The motor/generator 318 is selectively operatively connected with sun gear member 332 by engagement of torque-transmitting mechanism 354. Connecting member 340, which is a gear, rotates about shaft 360 and is connected for common rotation therewith by engagement of torque-transmitting mechanism 354. Connecting member 340 continuously meshes with gear 363, which rotates commonly with sun gear member 332.

The motor/generator 319 is selectively operatively connected with the carrier member 336, as well as the ring gear member 324 and the input member 316 by engagement of torque-transmitting mechanism 356. Connecting member 342, which is a gear, rotates about shaft 362 and is connected for common rotation therewith by engagement of torque-transmitting mechanism 356. Connecting member 342 continuously meshes with gear 365, which rotates commonly with the input member 316, the ring gear member 324, and the carrier member 336.

In comparison with the transmission 114 in FIG. 4, the ring gear member 324 corresponds with node C2; the carrier member 326 corresponds with node B2; the sun gear member 322 corresponds with node A2; the ring gear member 334 corresponds with node F2; the carrier member 336 corresponds with node E2; and the sun gear member 332 corresponds with node D2.

Input-Split, Electrically-Variable Mode

The transmission 314 is operable to provide an input-split, electrically-variable mode of operation by engaging torque-transmitting mechanisms 350 and 352. Engagement of torque-transmitting mechanisms 350 and 352 operatively connects motor/generators 318 and 319 with the sun gear member 322 and with the carrier member 326, respectively. Torque-transmitting mechanisms 354 and 356 remain open (i.e., not engaged and not transmitting torque). Because interconnecting member 346 continuously operatively connects ring gear member 334 and the output member 317 with carrier member 326, the motor/generator 318, motor/generator 319, engine 312, input member 316 and output member 317 are operatively connected with the ring gear member 324, sun gear member 322 and carrier member 326, which correspond with nodes C2, B2 and A2 of FIG. 4, and with nodes C, B and A of FIG. 1, respectively, in the same configuration as illustrated with respect to corresponding components in FIGS. 1 and 4, and an input-split, electrically-variable operating mode is established.

Output-Split, Electrically-Variable Mode

The transmission 314 is operable to provide an output-split, electrically-variable mode of operation by engaging torque-transmitting mechanisms 354 and 356. Engagement of torque-transmitting mechanisms 354 and 356 operatively connects motor/generators 318 and 319 with sun gear member 332 and carrier member 336, which correspond with nodes D2 and E2, respectively, in FIG. 4. Torque-transmitting mechanisms 350 and 352 remain open (i.e., not engaged and not transmitting torque). Because interconnecting member 344 continuously operatively connects ring gear member 324 and carrier member 336 with the input member 316, the motor/generator 318, motor/generator 319, engine 312, input member 316 and output member 317 are operatively connected with the sun gear member 332, carrier member 336 and ring gear member 334 in the same configuration as illustrated with respect to corresponding nodes D, E and F in FIG. 2 and corresponding nodes D2, E2 and F2 in FIG. 4, respectively, and an output-split, electrically-variable operating mode is established.

Fixed Ratio Operating Mode

The transmission 314 establishes a fixed ratio operating mode when all four torque-transmitting mechanisms 350, 352, 354 and 356 are engaged. In that instance, ring gear member 334 and carrier member 336 would both be operatively connected with motor/generator 319. When any two members of a planetary gear set rotate at given speeds, then the speeds for the members of the entire planetary gear set are given, as is known in the art. Thus, with input member 316 rotating at a given speed, and with all torque-transmitting mechanisms 350, 352, 354 and 356 engaged, the speeds of all members of planetary gear sets 320 and 320 will be given, and a fixed ratio between the input member 316 and the output member 317 will be established.

While the best modes for carrying out the invention have been described in detail, those familiar with the art to which this invention relates will recognize various alternative designs and embodiments for practicing the invention within the scope of the appended claims.

The invention claimed is:

1. An electrically-variable transmission comprising:
    four motive elements including an input member, an output member, a first and a second motor/generator;
    a first and a second differential gear set, each having a first, a second, and a third member;
    four selectively engagable torque-transmitting mechanisms;
    wherein two of the motive elements are each continuously operatively connected with a respective one of the members of the first differential gear set and a respective one of the members of the second differential gear set; and
    wherein the other two of motive elements are each selectively operatively connectable with any respective one of the members of the first differential gear set and with any respective one of the members of the second differential gear set via engagement of a respective one of the four torque-transmitting mechanisms, such that all members of each differential gear set have at least one of the motive elements either continuously operatively connected or selectively operatively connectable therewith, the input member and one of the motor/generators are both continuously operatively connected or selectively operatively connectable with the same member of one of the differential gear sets, and the output member and either one of the motor/generators are both continuously operatively connected or selectively operatively connectable with the same member of the other one of the differential gear sets; and
    wherein the torque-transmitting mechanisms are selectively engagable in combinations of two to establish an input-split, electrically-variable mode of operation and an output-split, electrically-variable mode of operation.

2. The electrically-variable transmission of claim 1, wherein the motor/generator continuously operatively connected or selectively operatively connectable with the same member of one of the differential gear sets as the input member is the same as the motor/generator continuously operatively connected or selectively operatively connectable with the same member of the other one of the differential gear sets as the output member.

3. The electrically-variable transmission of claim 1, wherein the motor/generator continuously operatively connected or selectively operatively connectable with the same member of one of the differential gear sets as the input member is different than the motor/generator continuously operatively connected or selectively operatively connectable with the same member of the other one of the differential gear sets as the output member.

4. The electrically-variable transmission of claim 1, wherein engagement of all four of the torque-transmitting mechanisms establishes a fixed ratio operating mode.

5. The electrically-variable transmission of claim 1, wherein neither the input member nor the output member is continuously operatively connected with any of the members of any of the differential gear sets.

6. The electrically-variable transmission of claim 1, wherein neither of the motor/generators is continuously operatively connected with any of the members of any of the differential gear sets.

7. The electrically-variable transmission of claim 1, further comprising:
    two interconnecting members each continuously connecting the respective member of the first differential gear set with the respective member of the second differential gear set with which two of the motive elements are each continuously operatively connected.

8. The electrically-variable transmission of claim 7, wherein the differential gear sets are planetary gear sets, wherein the first, second and third members of each of the planetary gear sets include a ring gear member, a sun gear member, and a carrier member; wherein the input member is continuously operatively connected with the ring gear member of the first planetary gear set; wherein the output member is continuously operatively connected with the ring gear member of the second planetary gear set; wherein one of the interconnecting members connects the ring gear member of the first planetary gear set for common rotation with the carrier member of the second planetary gear set and the other interconnecting member connects the carrier member of the first planetary gear set for common rotation with the ring gear member of the second planetary gear set.

9. The electrically-variable transmission of claim 1, wherein the differential gear sets are planetary gear sets, wherein the first torque-transmitting mechanism selectively operatively connects the first motor/generator with the sun gear member of the first planetary gear set, the second torque-transmitting mechanism selectively operatively connects the second motor/generator with the carrier member of the first planetary gear set, the third torque-transmitting mechanism selectively operatively connects the first motor/generator with the sun gear member of the second planetary gear set, and the fourth torque-transmitting mechanism selectively operatively connects the second motor/generator with the carrier member of the second planetary gear set.

10. An electrically-variable transmission comprising:
   four motive elements including an input member, an output member, a first and a second motor/generator;
   a first and a second planetary gear set, each having a first, a second, and a third member;
   a first, a second, a third, and a fourth selectively engagable torque-transmitting mechanism;
   two interconnecting members each continuously connecting a respective member of the first planetary gear set for common rotation with a respective member of the second planetary gear set; wherein any two of the motive elements are each continuously operatively connected with a respective one of the members with which one of the interconnecting members is continuously connected; and wherein the other two of the motive elements are each selectively operatively connected with a respective member of the first planetary gear set via a respective one of the torque-transmitting mechanisms and with a respective member of the second planetary gear set via another respective one of the torque-transmitting mechanisms, such that the input member and one of the motor/generators are either continuously or selectively operatively connected with the same member of one of the planetary gear sets and the output member and either of the motor/generators is either continuously or selectively operatively connected with the same member of the other one of the planetary gear sets.

11. The electrically-variable transmission of claim 10, wherein the torque-transmitting mechanisms are selectively engagable in combinations of two to establish an input-split, electrically-variable mode of operation and an output-split, electrically-variable mode of operation; and wherein selective engagement of all four of the torque-transmitting mechanisms establishes a fixed ratio operating mode.

12. The electrically-variable transmission of claim 10, wherein neither the input member nor the output member is continuously operatively connected with any of the members of any of the planetary gear sets.

13. The electrically-variable transmission of claim 10, wherein neither of the motor/generators is continuously operatively connected with any of the members of any of the planetary gear sets.

14. The electrically-variable transmission of claim 10, wherein the differential gear sets are planetary gear sets, wherein the first, second and third members of each of the planetary gear sets include a ring gear member, a sun gear member, and a carrier member; wherein the input member is continuously operatively connected with the ring gear member of the first planetary gear set; wherein the output member is continuously operatively connected with the ring gear member of the second planetary gear set; wherein one of the interconnecting members connects the ring gear member of the first planetary gear set with the carrier member of the second planetary gear set; and wherein the other interconnecting member connects the carrier member of the first planetary gear set with the ring gear member of the second planetary gear set.

15. The electrically-variable transmission of claim 10, wherein the first torque-transmitting mechanism selectively operatively connects the first motor/generator with the sun gear member of the first planetary gear set, the second torque-transmitting mechanism selectively operatively connects the second motor/generator with the carrier member of the first planetary gear set, the third torque/transmitting mechanism selectively operatively connects the first motor/generator with the sun gear member of the second planetary gear set, and wherein the fourth torque-transmitting mechanism selectively operatively connects the second motor/generator with the carrier member of the second planetary gear set.

16. An electrically-variable transmission comprising:
   an input member and an output member;
   a first and a second planetary gear set, each having a first, a second, and a third member;
   a first and a second motor/generator;
   two interconnecting members each continuously connecting a respective member of the first planetary gear set for common rotation with a respective member of the second planetary gear set; wherein one of the first motor/generator, the second motor/generator, and the input member is continuously operatively connected with the member of the first planetary gear set with which one of the two interconnecting members is also continuously connected and one of the first motor/generator, the second motor/generator and the output member is continuously operatively connected with the member of the second planetary gear set with which the other of the two interconnecting members is also continuously connected;
   four selectively engagable torque-transmitting mechanisms, two of which selectively operatively connect one of the first motor/generator, the second motor/generator, the input member and the output member not continuously connected with either of the interconnecting members with a member of the first planetary gear set and a member of the second planetary gear set, respectively, and the other two of which selectively operatively connect a different one of the first motor/generator, the second motor/generator, the input member and the output member not continuously connected with either of the interconnecting members with a different member of the first planetary gear set and a different member of the second planetary gear set, respectively; wherein the torque-transmitting mechanisms are selectively engagable in pairs to establish a first and a second electrically variable operating mode; and wherein the first electrically-variable operating mode is an input-split operating mode and the second electrically-variable operating mode is a compound-split operating mode.

* * * * *